US006452694B1

(12) United States Patent
Eisenberg et al.

(10) Patent No.: US 6,452,694 B1
(45) Date of Patent: Sep. 17, 2002

(54) DESIGN OF TEXT AND GRAPHIC IMAGERY ON FLAG OR TAB MEDIA

(75) Inventors: Peter M. Eisenberg, Minneapolis; Michael E. O'Brien, White Bear Lake, both of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/134,794

(22) Filed: Aug. 14, 1998

(51) Int. Cl.[7] .................................................. G06F 3/12

(52) U.S. Cl. ........................ 358/1.18; 358/1.6; 358/1.12

(58) Field of Search ................................ 358/1.6, 1.11, 358/1.12, 1.13, 1.14, 1.18; 382/293, 296, 297; 707/517, 520, 527

(56) References Cited

U.S. PATENT DOCUMENTS

| | | | | |
|---|---|---|---|---|
| 3,937,493 A | | 2/1976 | Fasbender | |
| 4,201,403 A | | 5/1980 | Turner | |
| 4,718,784 A | | 1/1988 | Drisko | 400/68 |
| 5,182,152 A | | 1/1993 | Ericson | |
| 5,332,265 A | * | 7/1994 | Groess et al. | 283/56 |
| 5,621,864 A | | 4/1997 | Benade et al. | 358/1.18 |
| 5,982,999 A | * | 11/1999 | Aoyagi et al. | 358/1.18 |

FOREIGN PATENT DOCUMENTS

| | | |
|---|---|---|
| EP | 0557137 A2 | 8/1993 |
| EP | 0574657 A2 | 12/1993 |
| EP | 0 632 408 A1 | 1/1995 |
| EP | 0855282 A2 | 7/1998 |
| JP | 08077242 | 3/1996 |
| WO | WO 92/21097 | 11/1992 |

OTHER PUBLICATIONS

Avery Software LabelPro™ for Windows, Users Guide, Version 2.0 User's Guide, Copyright © Avery Dennison Corporation (1994), Second Printing, Jan. 1995.

Novell PerfectOffice for Windows, WordPerfect Version 6.1 User's Guide, Labels, pp. 311–318, ©Corel Corporation, 1993.

* cited by examiner

*Primary Examiner*—Mark Wallerson
(74) *Attorney, Agent, or Firm*—Shumaker & Sieffert, P.A.

(57) ABSTRACT

Printed articles such as flag or tab media can be printed with text and/or graphic objects specified by a user. The flag or tab media are useful in marking and indexing functions. The printed text and/or graphic objects can enhance the communicative and organizational effects of the tab or flag media, conveying information indicative of order, sequence, or identification. The flag or tab media can be arranged on a print sheet that is fed into a desktop printer. The layout of the flag or tab media on the print sheet can necessitate "upside-down" printing of the objects in certain areas to achieve an appropriate orientation during use, particularly for folded or inverted media. In this manner, the orientation of an object is flipped according to its position on the media. A design application program executed by a computing system allows an end user to design objects on flag or tab media without worrying about the necessary flipping functions. The application automates the flipping functions, and incorporates them into the workflow of the design process.

52 Claims, 9 Drawing Sheets

DESIGN OF TEXT AND GRAPHIC IMAGERY ON FLAG OR TAB MEDIA

TECHNICAL FIELD

The present invention relates to print layout design and, more particularly, to the design of graphic and text imagery on flag or tab media.

BACKGROUND INFORMATION

Adhesive-backed note media, such as Post-it® notes, are widely used in a variety of settings to facilitate communication and organization. Unique adhesives carried by such notes enable convenient repositioning and reuse. Adhesive-backed notes are commercially available in many different configurations. Notes can be ordered, for example, with many selected colors as well as different text and/or graphic designs. Order selection is quite extensive, but nevertheless limited to those designs made available by the notes suppliers. End users have been able to obtain notes with custom configurations from suppliers, but usually only in large quantities. More recently, however, users have been able to take advantage of notes design software and printable note media. Post-it® Notes Design Software, for example, provides a software application that enables an end user to specify different graphic and/or text objects to be printed on sheets carrying multiple notes. In this manner, an end user is able to design notes on a custom basis to satisfy particular needs or tastes. The graphic and/or text objects can be created by the end user, or obtained from a directory of stock clip art objects provided with the notes design application. The end user can print the notes on demand using an ordinary desktop printer.

Continued usage of adhesive-backed notes has led to a number of variations and extensions. Adhesive-backed flags, such as Post-it® flags, for example, have been available for several years. Such flags are commercially available in several sizes and colors and, in some cases, carry text and/or graphic imagery such as numbers, letters, arrows, and the like. Post-it® flags have been used for many applications including page-marking, place-marking, and indexing. Incorporation of unique indicia such as text and/or graphic imagery can enhance the communicative and organizational aspects of the marking or indexing function. Some flags are specially configured for manual marking by pen or pencil. However, end users have been unable to custom-design flags in a professional looking manner. In particular, a software application appropriate for custom design of graphic and text objects on flags has been unavailable. At the same time, printable sheets of flags have been generally unavailable to end users. Consequently, aside from manually markable flags, user selection of flag media has been limited to those configurations made available by suppliers.

Continued research has led to a recent extension of Post-it® flag technology that enables end users to conveniently print flags with desired text and/or graphic objects. In particular, flags are arranged in pairs and positioned end-to-end on a carrier sheet. The carrier sheet is fed into a printer to print objects on the flags. Each flag includes an adhesive-bearing portion. For manufacturing reasons, the adhesive-bearing portions of the flags in each pair are arranged adjacent one another on a carrier sheet. The image-bearing portions, however, extend away from one another in opposite directions. With this arrangement, the image-bearing portions of the first and second flags are effectively inverted relative to one another. The inversion can be vertical or horizontal. If the inversion is vertical, the image-bearing portions are upside-down relative to one another. In use, the flags ordinarily are used with the same orientation. Accordingly, it is desirable that text and/or graphic objects printed on the flags also occupy the same orientation. To produce text and/or graphic objects with the same orientation in end use, the objects in the flags must be designed and printed with different orientations. In this manner, the objects are designed and printed to compensate for the manufacturing-induced orientations of the flags on the carrier sheet.

Another recent extension of Post-it® flag technology involves the adaptation of flag media for use as foldable index tabs. The tab is foldable about a line that separates first and second fold sections. Several tabs can be carried on a single print sheet for custom design and printing. When carried on the print sheet, the first and second fold sections of each tab lie flat and face in the same direction, i.e., outward from the print sheet. Upon removal from the print sheet, however, the tab is folded such that the first and second fold sections face away from one another. The inner sides of the tab may carry adhesive material that facilitates adhesive attachment of the tab to opposite sides of a sheet-like element such as a file folder or divider. Upon attachment, each of the first and second fold sections is visible from a different side of the sheet-like element.

In the folded position, it is desirable that text and/or graphic objects printed in the fold sections of the tab occupy the same orientation. Specifically, the text and/or graphic objects should have the same orientation when viewed from each side of the sheet-like element to which the tab is attached. In the flat position on the print sheet, however, the fold sections are inverted relative to one another. The inversion can be vertical or horizontal depending on the arrangement of the print sheet. If the inversion is vertical, the fold sections are upside-down relative to one another when the tab occupies a flat, i.e., unfolded, position. To produce text and/or graphic objects with the same orientation in the folded position, the objects in the fold sections of the tab must be designed and printed in the flat position with different orientations.

SUMMARY

The present invention is directed to the design of text and/or graphic imagery on printed articles such as flag or tab media. In particular, the present invention is directed to the design of flag or tab media that require design and printing of at least some of the text and/or graphic imagery with different orientations. The present invention can be implemented by a software application program executed in a general purpose computing system. The present invention is embodied in a design method implemented via the application program, and also in an article of manufacture, in the form of a data storage medium, that stores application program code arranged to carry out that method upon execution by a processor.

The flag media designed in accordance with the present invention may take the form of conventional Post-it® flags. The tab media represent an extension of the flag media, and may take the form of foldable index tabs. The flag or tab media are carried by a print sheet that is fed into a desktop printer. The flag or tab media can be adhesive-backed for attachment to sheet-like elements such as sheets of paper, file folders, dividers, and the like. The tab media, as an alternative, can be sized for insertion into tab holders or sleeves carried with file folders and need not carry an adhesive. Also, the tab media can be carried on a carrier sheet by adhesive attachment. Alternatively, the tab media can be defined by perforations in a carrier sheet and thereby form an integral part of the print sheet. In this case, the tab media conforms substantially to conventional perforated tab sheets.

The flag or tab media are useful in marking and indexing applications. The incorporation of particular text and/or graphic objects on the flag or tab media can enhance the desired communicative and organizational effects of the flag or tab media, conveying information indicative of order, sequence, or identification. The arrangement of the flag or tab media on the print sheet necessitates design and printing of the objects in particular areas with different orientations. Specifically, one object must be printed with a "flipped," i.e., "upside-down," orientation in which the object is effectively rotated approximately 180 degrees for printing onto the inverted area. The rotation of the object can be made about a midpoint of the media such that the object is effectively mapped into the inverted area with an upside-down orientation. With this mode of design and printing, the objects thereby occupy an appropriate orientation in both sections during use of the flag or tab media.

The present invention is implemented by a software application that enables the end user to specify text and/or graphic objects to be printed on the article without worrying about the necessary flipping functions. The software application automates such functions, and incorporates them into the workflow of the design process. Consequently, the present invention eliminates the need to refeed print sheets in an inverted orientation for inverted printing. Also, the present invention eliminates the need to visually identify objects that require inversion during the design process, and then manually enter invert commands relative to such objects. Instead, objects entered in particular areas are automatically "flipped" to facilitate viewing during end use. In particular, an object is subjected to geometric operations that effectively rotate the object approximately 180 degrees for printing onto the inverted area of the flag or tab media. This rotation can be made about a midpoint between the first and second portions in the event the object is entered into the first portion, and a representation of the object with an upside-down orientation is desired within the second portion. In one embodiment, an object entered by a user is automatically entered in first and second portions of the article with normal and flipped orientations, respectively. In another embodiment, an object entered in a particular area requiring inverted printing is automatically flipped.

In a first embodiment, the present invention provides a method for producing a printed article having first and second portions, the method comprising displaying a representation of the article on a display device, receiving user input specifying an object to be formed within the article, displaying the object with a first orientation within the first portion of the displayed article, and displaying the object with a second orientation within the second portion of the displayed article, wherein the second orientation is different from the first orientation. The article may comprise a pair of flags or a foldable index tab.

In a second embodiment, the present invention provides a method for producing a printed article having first and second portions, the method comprising displaying a representation of the article on a display device, receiving user input specifying an object to be formed within the article and a position of the object, displaying the object with a first orientation within the first portion of the displayed article in the event the position of the object is within the first portion of the displayed article, and displaying the object with a second orientation within the second portion of the displayed article in the event the position of the object is within the second portion of the displayed article, wherein the second orientation is different from the first orientation. The article may comprise a pair of flags or a foldable index tab.

In a third embodiment, the present invention provides a computer readable medium encoded with a computer program, the program being arranged such that, when the program is executed, a representation of a printed article having first and second portions is displayed on a display device, user input is received specifying an object to be formed within the article, the object is displayed with a first orientation within the first portion of the displayed article, and the object is displayed with a second orientation within the second portion of the displayed article, wherein the second orientation is different from the first orientation. The article may comprise a pair of flags or a foldable index tab.

In a fourth embodiment, the present invention provides a computer readable medium encoded with a computer program, the program being arranged such that, when the program is executed a representation of the article is displayed on a display device, user input is received specifying an object to be formed within the article and a position of the object, the object is displayed with a first orientation within the first portion of the displayed article in the event the position of the object is within the first portion of the displayed article, and the object is displayed with a second orientation within the second portion of the displayed article in the event the position of the object is within the second portion of the displayed article, wherein the second orientation is different from the first orientation. The printed article may comprise a pair of flags or a foldable index tab.

In a fifth embodiment, the present invention provides a method for producing a foldable tab having first and second fold sections and an adhesive material, whereby the tab is foldable for adhesive attachment to opposite sides of a sheet-like member such that each of the first and second fold sections is visible from a different side of the sheet-like member, the method comprising displaying a representation of the tab on a display device, receiving user input specifying an object to be formed within the tab, displaying the object with a first orientation within the first fold section of the displayed tab, displaying the object with a second orientation within the second section of the displayed tab, and driving a printing device to form a printed tab that substantially conforms to the displayed tab, wherein the second orientation is different from the first orientation.

In a sixth embodiment, the present invention provides a method for producing a pair of first and second flags, the second flag being arranged with an inverse orientation relative to the first flag, and each of the first and second flags including an adhesive material, whereby the flags are configured for adhesive attachment to a sheet-like element, the method comprising displaying a representation of the first and second flags on a display device, receiving user input specifying an object to be formed within the first and second flags, displaying the object with a first orientation within the first flag, displaying the object with a second orientation within the second flag, wherein the second orientation is different from the first orientation, and driving a printing device to form a first printed flag that substantially conforms to the first displayed flag, and a second printed flag that substantially conforms to the second displayed flag.

In a seventh embodiment, the present invention provides a method for producing a foldable tab having first and second fold sections and an adhesive material, whereby the tab is foldable for adhesive attachment to opposite sides of a sheet-like member such that each of the first and second fold sections is visible from a different side of the sheet-like member, the method comprising displaying a representation of the tab on a display device, receiving user input specifying an object to be formed within the tab and a position of the object, displaying the object with a first orientation within the first section of the displayed tab in the event the position of the object is within the first section of the displayed tab, displaying the object with a second orientation within the second section of the displayed tab in the event the position of the object is within the second section of the displayed tab, wherein the second orientation is different from the first orientation, and driving a printing device to form a printed tab that substantially conforms to the displayed tab.

In an eighth embodiment, the present invention provides a method for producing a pair of first and second flags, the second flag being arranged with an inverse orientation relative to the first flag, and each of the first and second flags including an adhesive material, whereby the flags are configured for adhesive attachment to a sheet-like element, the method comprising displaying a representation of the first and second flags on a display device, receiving user input specifying an object to be formed within the first and second flags and a position of the object, displaying the object with a first orientation within the first flag in the event the position of the object is within the first flag, displaying the object with a second orientation within the second flag in the event the position of the object is within the second flag, wherein the second orientation is different from the first orientation, and driving a printing device to form a first printed flag that substantially conforms to the first displayed flag and a second printed flag that substantially conforms to the second displayed flag.

In a ninth embodiment, the present invention provides a method for printing N objects indicative of a sequence 1–N on differently color media having m different colors and carried on print sheets, wherein m is less than N, and each of the color media sharing a common one of the colors is carried on a common one of the print sheets, the method comprising printing a first one of the objects on one of the media on a first one of the print sheets corresponding to a first one of the colors, printing a second one of the objects on one of the media on a second one of the print sheets corresponding to a second one of the colors, and printing an (m+1)th one of the objects on one of the media on the first one of the print sheets, wherein both the first and (m+1)th objects are printed prior to printing the second object.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
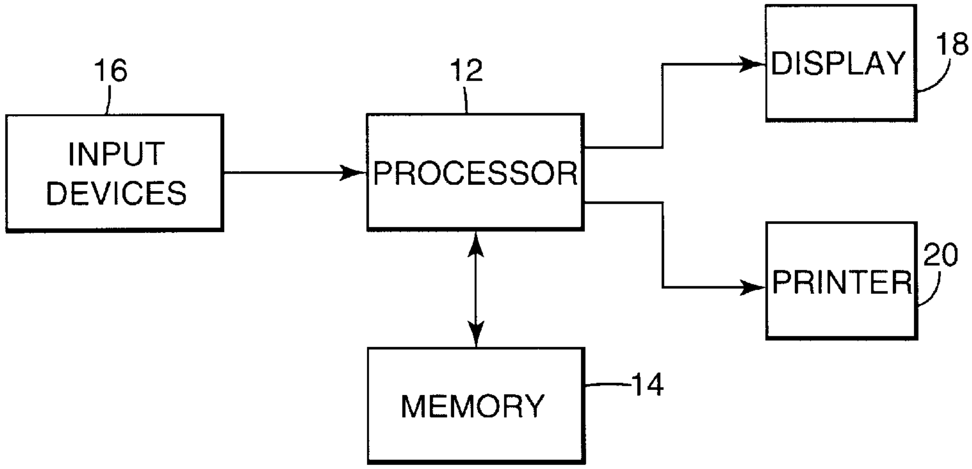
FIG. 1 is a functional block diagram of a computing system configured for design of text and/or graphic imagery on flag or tab media.

FIG. 1 is a functional block diagram of an exemplary computing system 10 for design of text and/or graphic imagery on flag or tab media, in accordance with an embodiment of the present invention. As shown in FIG. 1, system 10 may include a processor 12, a memory 14, input devices 16, a display device 18, and a printer 20. Processor 12 includes a central processing unit (CPU) that forms part of a general purpose computer, such as a PC, Macintosh, or workstation. Memory 14 stores program code for execution by processor 12, including operating system code and application program code, and generally represents a magnetic hard drive or other storage device in combination with random access memory (RAM) accessed by processor 12. As one example, memory 14 could be realized in part by a storage drive containing removable storage media carrying the application program code. Input devices 16 include input media for entry of user input, such as a keyboard, mouse, and the like. Display device 18 includes a viewing screen that provides graphic output. The screen may take the form of a CRT or flat panel monitor. Printer 20 can be realized by a desktop printer such as an inkjet or laser printer. In some embodiments, printer 20 provides multi-color output. Processor 12 communicates with input devices 16, display device 18, and printer 20 via one or more input/output controllers (not shown in FIG. 1).

In accordance with an embodiment of the present invention, memory 14 stores application program code arranged to facilitate the design of text and/or graphic imagery on flag or tab media. The application program code can be uploaded onto a hard drive and into RAM, as necessary, for execution by processor 12. Alternatively, the application program code can be encoded on any of a variety of removable storage media and uploaded to RAM during operation. In general, upon execution of the application program code, processor 12 is configured to process user input received from input devices 16, drive display device 18 to provide the user with interactive output representative of design workflow, and drive printer 20 to produce printed imagery on printed articles such as flag or tab media, as designed by the user. In particular, processor 12 drives display device 18 to display a representation of a printed article, such as a pair of flags or a foldable tab. The individual flags form first and second portions of the displayed article. Alternatively, the foldable tab provides fold sections that form first and second portions of the displayed article. In either case, as will be explained, the format of the printed article necessitates design and printing of objects within one of the portions with an "upside-down" orientation. The application program code stored in memory 14 and executed by processor 12 is arranged to enable design and printing of flag or tab media using system 10.

During execution of the application program code, processor 12 receives and processes user input from input devices 16. With the user input, an end user specifies one or more text and/or graphic objects to be formed within the article. Text objects may include letters, numbers, words, symbols, and other character strings, in a variety of fonts and point sizes. Graphic objects may include graphic imagery such as clip art stored as stock objects in a variety of formats. Alternatively, original graphic objects can be created by the end user. Original graphic objects can be created during execution of the application program, for example, via an integrated object design tool. Also, original graphic objects can be created using other graphic design applications and imported for processing within system 10. In addition to picture-like objects, the graphic objects may take the form of colored bands, borders, or other colored indicia applied to the printed article for visible distinctiveness. In this manner, several printed articles can be designed with different colors. In any event, the text and/or graphic objects are converted as necessary to a common bitmap form for processing by processor 12.

In one embodiment, processor 12 drives display device 18 to display a representation of a specified object with a first orientation within the first portion of the displayed article. At the same time, processor 12 drives display device 18 to display the object with a second orientation within the second portion of the displayed article. In this mode, the user enters a single object that is displayed identically, albeit with rotated orientation, within the first and second portions of the article. Specifically, the object that is displayed within the second portion is effectively "flipped" by rotating it approximately 180 degrees. The flipped, or "upside-down," orientation of the object facilitates viewing of the object in a normal orientation during its end use, such as an indexing application. To place the upside-down object within the second portion, the rotation can be made about a midpoint between the first and second portions. In this manner, the object is rotated to the upside-down orientation and moved into the second portion.

The user input also may include indication of a position for entry of the object, as indicated by a mouse or other pointing device. In another embodiment, the application program code can be arranged such that processor 12 drives display device 16 to display the object within the first portion of the displayed article in the event the position of the object is within the first portion. In this case, the object is displayed with a normal orientation. If the position of the object is within the second portion of the article, processor 12 drives display device 16 to display the object with a flipped orientation within the second portion of the displayed article. The flipped orientation can be accomplished by rotating the object, e.g., approximately 180 degrees relative to the normal orientation in which it is originally displayed prior to the flip operation. Alternatively, a translation operation could be included, before or after the rotation, if the rotation is made about a central point of the object. Rather, the object can be displayed roughly at the position initially indicated by the user input device. This mode not only enables selective entry of the object within the first or section portion, but also can be configured to allow entry of different objects in the first and second portions. Accordingly, this latter mode may be particularly applicable to the design of flag pairs, where design of different objects on the flags often will be desirable.

In either mode, display of the object in a flipped orientation can be achieved by geometrically manipulating the raw bitmap data on a point-by-point basis, for example, by well known rotation operations. Such operations can be carried out using matrices. When the end user completes the design of the printed article, processor 12 creates or updates a file representative of the article. The file may represent several articles designed by the user. At the request of the user, processor 12 drives printer 20 based on the contents of the file to form a printed representation that substantially corresponds to the displayed article or articles. The format of the article is such that the flipped and non-flipped objects are viewed with a common orientation during use of the article by an end user for its intended purpose. A tab, for example, is folded by the end user to produce the desired orientation. With a pair of flags, one of the flags is rotated by the end user to produce the desired orientation. The unique formatting that requires flipped design and printing of flag or tab media is explained in detail below.

Figure 2:
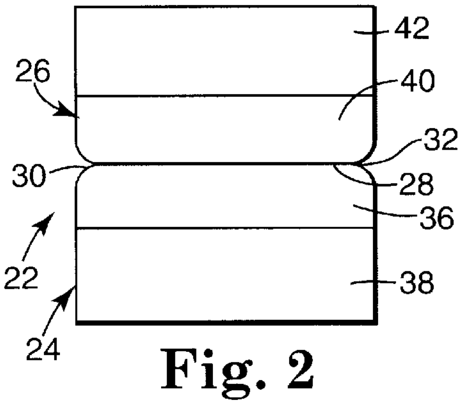
FIG. 2 is a diagram of a foldable tab.
Figure 3:
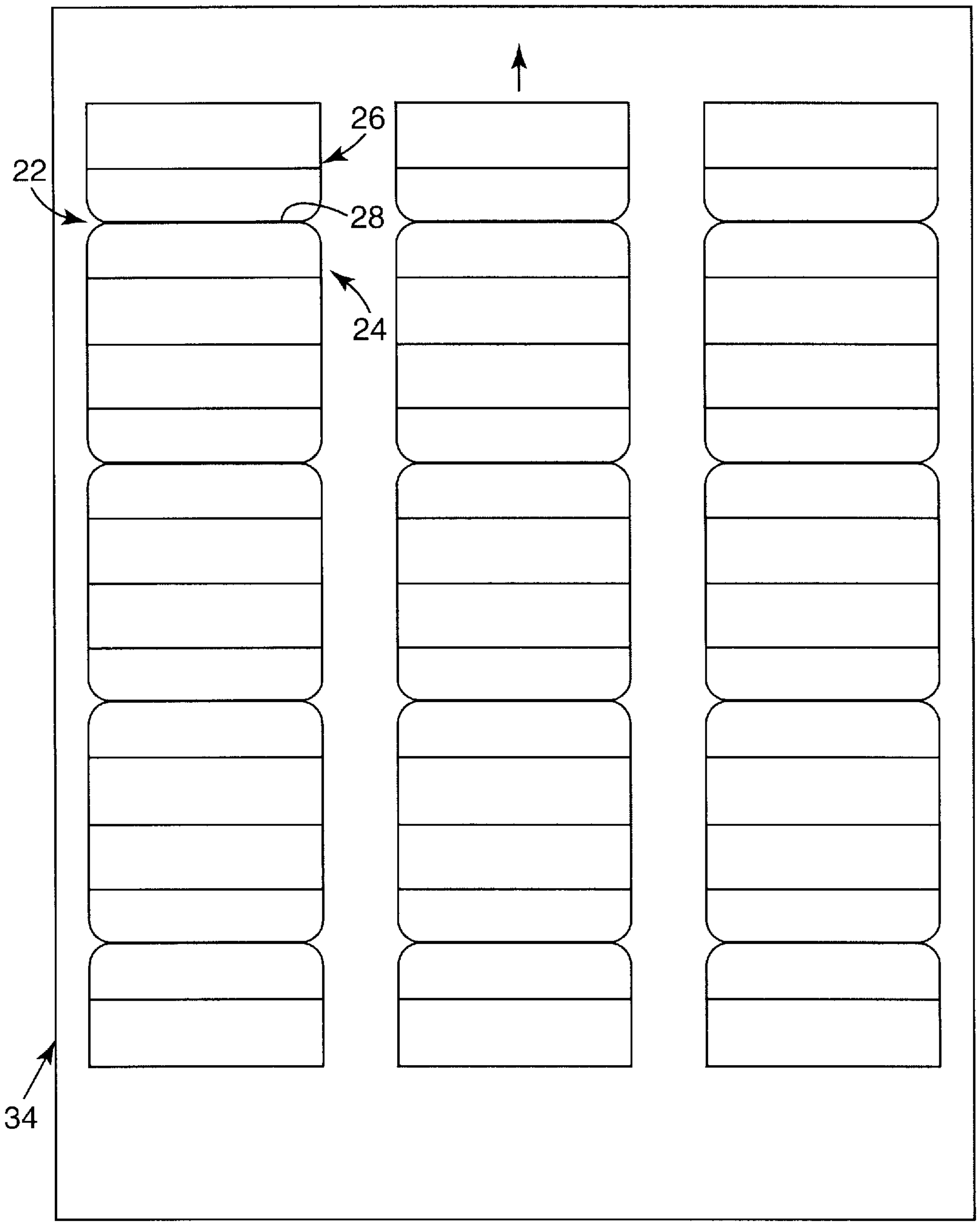
FIG. 3 is a diagram of a print sheet carrying several tabs as shown in FIG. 2.

FIG. 2 is a diagram of an exemplary foldable tab 22 for use in an embodiment of the present invention. As shown in FIG. 2, tab 22 is arranged in a flat, unfolded position for design and printing by printer 20. Tab 22 includes a first fold section 24 and a second fold section 26. Tab 22 is foldable about a fold line 28 that separates first and second fold sections 24, 26. Lateral cut-outs 30, 32 facilitate the folding of tab 22 about fold line 28. As shown in FIG. 3, several tabs 22 can be carried on a single print sheet 34 by adhesive attachment. As an alternative, tabs 22 may be integrally formed with print sheet 34 and defined by perforations for detachment and insertion into tab holders or sleeves associated with a file folder. Print sheet 34 is fed through printer 20 to print text and/or graphic objects on tabs 22, according to user specification. When carried on print sheet 34, first and second fold sections 24, 26 lie flat and face in the same direction, i.e., outward from the print sheet. Upon removal from print sheet 34, however, the end user manually folds tab 22 inward such that first and second fold sections 24, 26 face away from one another.

Figure 4:
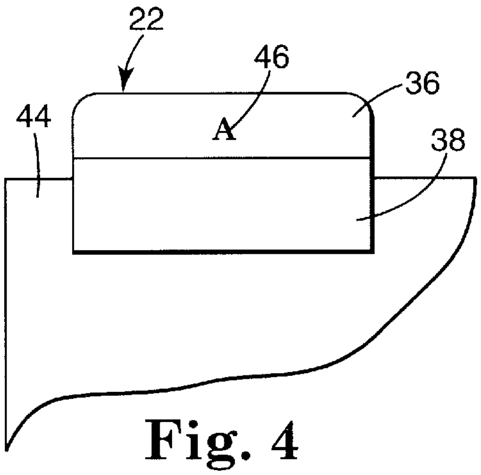
FIG. 4 is a diagram of a tab as shown in FIG. 2 in a folded configuration and attached to a sheet-like element.

In an adhesive-bearing embodiment, first fold section 24 includes an image-bearing portion 36 and an attachment portion 38. Similarly, second fold section 26 includes an image-bearing portion 40 and an attachment portion 42. Image-bearing portions 36, 40 can be pre-printed with a colored band, as illustrated in FIG. 3, or provided in a blank format. The inner side of tab 22, i.e., the side facing print sheet 34, carries an adhesive material. The adhesive material is carried at positions generally opposite attachment portions 38, 42, and facilitates adhesive attachment of the tab to opposite sides of a sheet-like element such as a file folder or divider. In this manner, tab 22 can be used as an index tab, particularly in conjunction with appropriate text and/or graphic objects order, sequence or identification. As one example, tab 22 may find application as an index tab for a hanging file folder. FIG. 4 is a diagram of a tab 22 in the folded configuration and attached to a sheet-like element 44 such as a file folder. Upon attachment to sheet-like element 44, each fold section 24, 26 is visible from a different side to provide two-sided visibility for indexing ease.

In the folded position, it is desirable that text and/or graphic objects printed in fold sections 24, 26 occupy the same orientation. Specifically, the text and/or graphic objects should have the same orientation when viewed from each side of the sheet-like element to which tab 22 is attached. FIG. 4 further illustrates an object formed in image-bearing portion 36 with a vertical orientation. In FIG. 4, the object is a text object in the form of the letter A, as indicated by reference numeral 46. For purposes of illustration, tab 22 is described herein as including image-bearing portions 36, 40 to carry text and/or graphic objects. In some applications, however, it may be desirable to design and print objects over the entire surface of the respective fold sections 24, 26. Thus, objects could be formed over or within the areas described as both image-bearing portions 36, 40 and adhesive-bearing portions 38, 42.

When image-bearing portion 40 is viewed from the opposite side of sheet-like element 44, the letter A or some other specified object formed on that side should occupy the same vertical orientation. In other words, it is clear that the object should not be printed upside-down when tab 22 is used as a two-sided index tab. In the flat position on print sheet 34, however, image-bearing portions 36, 40 of fold sections 24, 26, respectively, are inverted relative to one another. The inversion can be vertical or horizontal depending on the arrangement of print sheet 34. In FIGS. 2 and 3, the inversion is illustrated in terms of vertical orientation. If objects were printed in image-bearing portions 36, 40 with the same orientation, folding of tab 22 would produce objects with different orientations. To produce text and/or graphic objects with the same orientation in the folded position, the objects in the fold sections 24, 26 must be designed and printed in the flat position with different orientations. Thus, in light of the folded end use of tab 22, one of the objects must be intentionally printed upside-down.

In particular, to facilitate readability during end use, one of the objects should be rotated, e.g., approximately 180 degrees, for printing within the inverted fold section. It should be apparent that such rotation preferably does not produce a "mirror" image, at least for text imagery. A mirror image would result in an inverted object that, in the case of text imagery, would be illegible. Specifically, the text would flow from right to left when viewed in the end orientation of tab 22. Thus, the rotation operation, as described herein, preferably provide an orientation that is "flipped," but is readable from left to right in the case of text imagery when the tab 22 is viewed in its end use. The application program code stored in memory 14 is arranged to carry out the necessary operations upon execution by processor 12, and to automate those functions for the end user as part of the tab design process.

Figure 5:
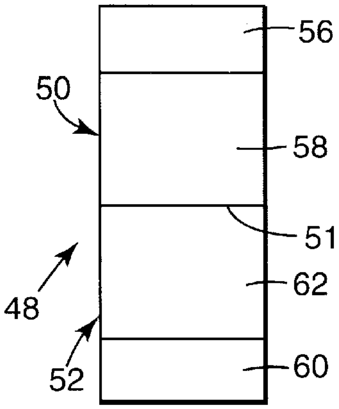
FIG. 5 is a diagram of a flag pair.
Figure 6:
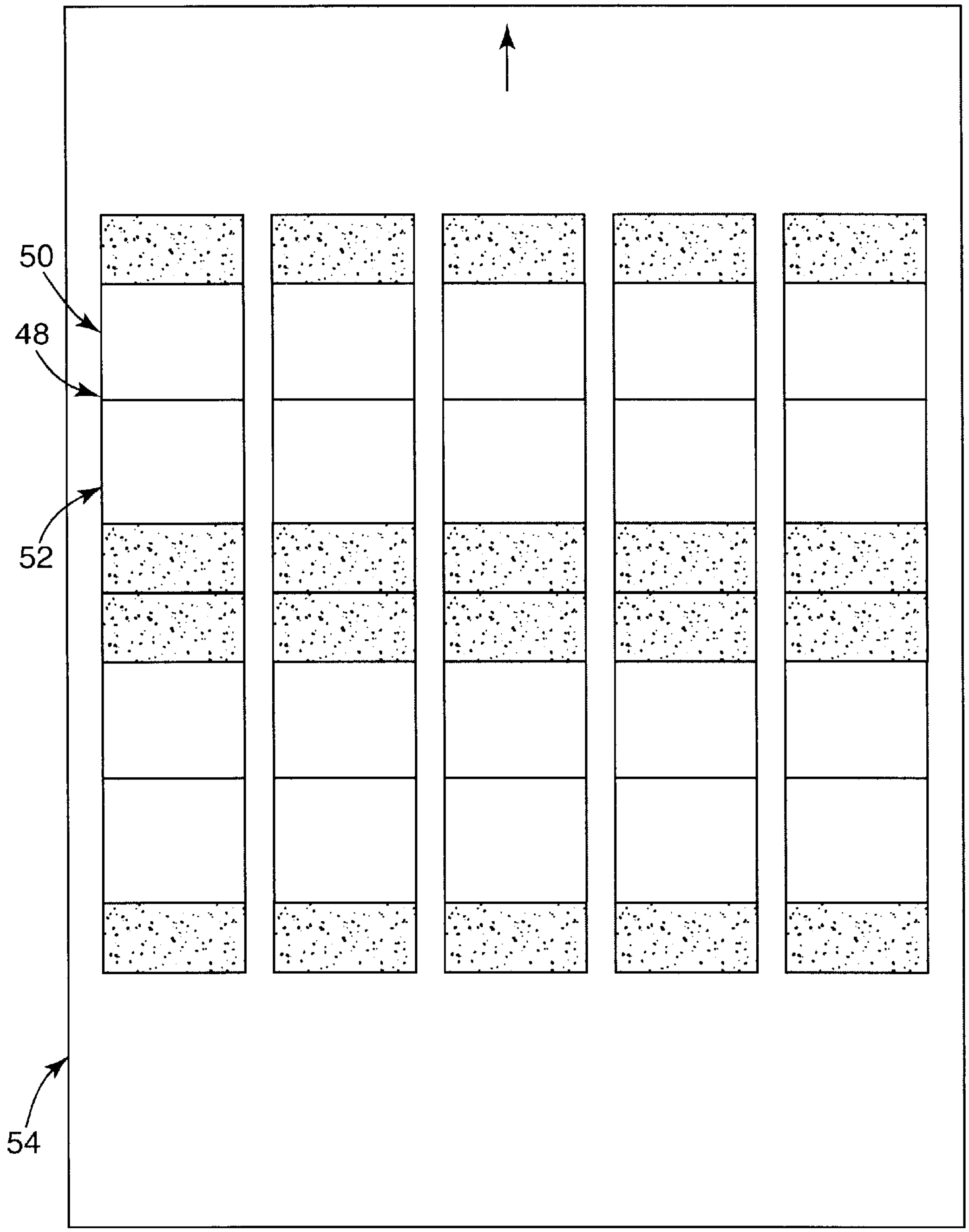
FIG. 6 is a diagram of a print sheet carrying several flag pairs as shown in FIG. 5.

FIG. 5 is a diagram of a flag pair 48. As shown in FIG. 5, flag pair 48 includes a first flag 50 and a second flag 52. Flags 50, 52 may substantially correspond in structure to any of the variety of Post-it® flag configurations commercially available from Minnesota Mining & Manufacturing Company (3M) of St. Paul, Minn. As shown in FIG. 6, several flag pairs 48 can be carried on a single print sheet 54 by adhesive attachment. Each flag pair 48 is divided into first and second flags 50, 52 at line 51. Flag 50 includes an image-bearing portion 56 and an attachment portion 58. Similarly, flag 52 includes an image-bearing portion 60 and an attachment portion 62. Objects could be designed and printed, however, over or within the entire areas indicated by image-bearing portions 56, 60 and attachment portions 58, 62. Flags 50, 52 carry the adhesive materials in areas opposite attachment portions 58, 62. For manufacturing reasons, flags 50, 52 are arranged end-to-end on print sheet 54 such that attachment portions 58, 62 are positioned adjacent one another and image-bearing portions 56, 60 are positioned opposite one another. Although the arrangement shown in FIG. 6 is amenable to end user printing via printer 20, it complicates the design of text and/or graphic objects in image-bearing portions 56, 60. Specifically, with this arrangement, image-bearing portions 56, 60 are inverted relative to one another. Again, the inversion is illustrated in FIGS. 5 and 6 as vertical, but may be horizontal depending on the arrangement of flag pairs 48 on print sheet 54.

Figure 7:
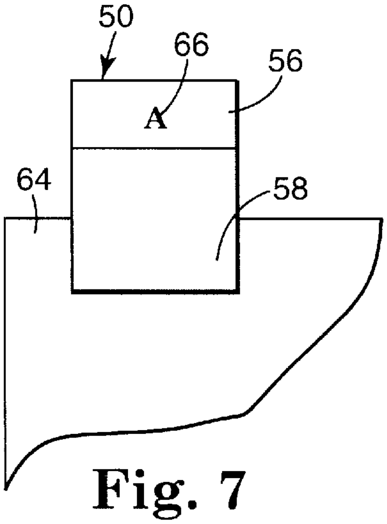
FIG. 7 is a diagram of a flag as shown in FIG. 5 and attached to a sheet-like element.

FIG. 7 is a diagram of a flag 50 attached to a sheet-like element 64. In FIG. 7, flag 50 includes a text object, in the form of the letter A, indicated by reference numeral 66. In this example, the letter A occupies a vertical orientation relative to sheet-like element 64. Flags 50, 52 often will be used in the same orientation. For example, flags 50, 52 may extend in any number of directions from the edge of a sheet of paper, file folder, or divider. Accordingly, it is desirable that text and/or graphic objects printed on adjacent flags 50, 52 also occupy the same orientation during end use. To produce text and/or graphic objects with the same orientation in use, the objects in the flags 50, 52 are designed and printed in the flat position with different orientations relative to one another. In other words, as with tab 22, one of the objects in flags 50, 52 must be intentionally "flipped," i.e., printed upside-down. In particular, the objects printed in image-bearing portion 60 must be printed with an flipped, i.e., rotated, orientation. Upon detachment from print sheet 54 and rotation to the orientation of flag 50, the object in image-bearing portion 60 will occupy the same orientation as the object in image-bearing portion 56. The application program code stored in memory 14 is arranged to carry out the functions necessary to flip the objects printed in flags 50, 52 and, again, to incorporate such functions in an automated manner into the workflow of the flag design process.

Figure 8:
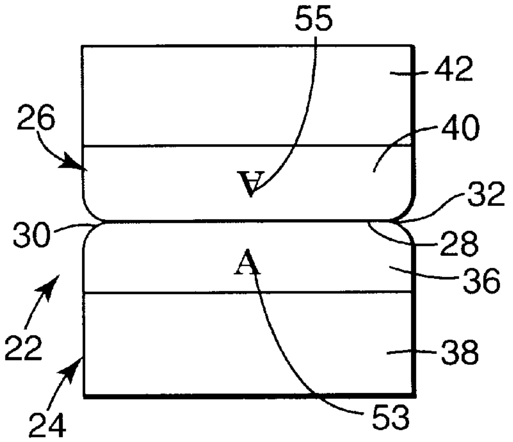
FIG. 8 is a diagram illustrating design of text imagery on a tab as shown in FIG. 2.
Figure 9:
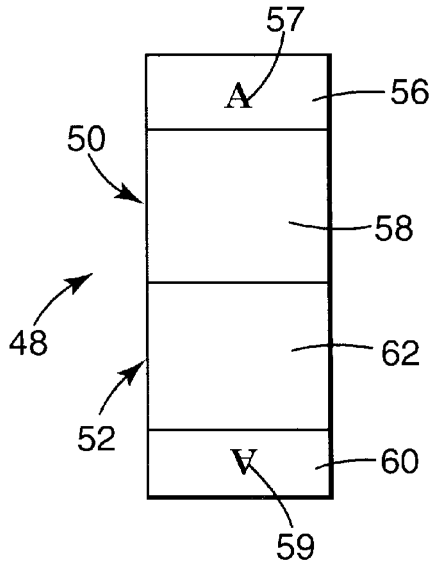
FIG. 9 is a diagram illustrating design of text imagery on a flag pair as shown in FIG. 5.
Figure 10:
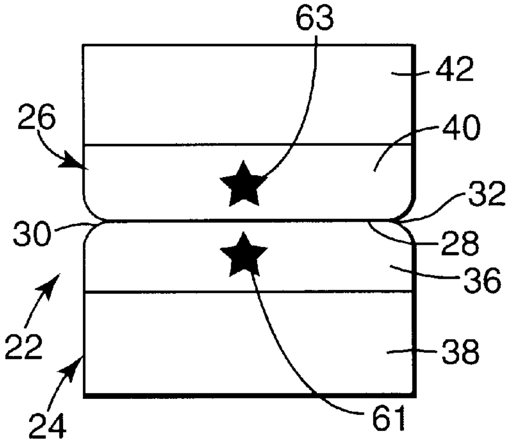
FIG. 10 is a diagram illustrating design of graphic imagery on a tab as shown in FIG. 2.
Figure 11:
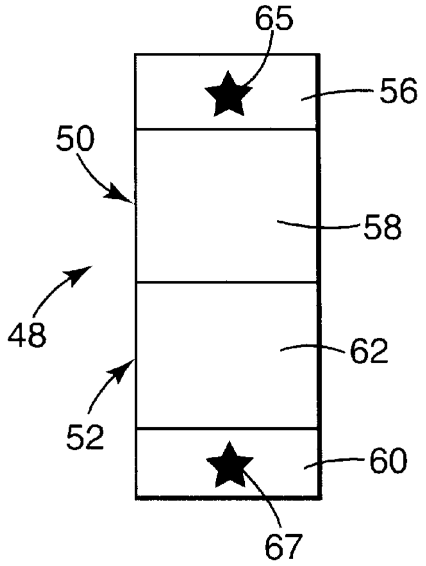
FIG. 11 is a diagram illustrating design of graphic imagery on a flag pair as shown in FIG. 5.

FIGS. 8–11 are diagrams illustrating the printing of text and graphic objects within tab 22 and flag pair 48 of FIGS. 2 and 5, respectively. In FIG. 8, a simple text object in the form of the letter A is formed within image-bearing portion 36 of first fold section 24 with a normal orientation, as indicated by reference numeral 53, whereas the same object is formed within image-bearing portion 40 of second fold section 26 with a flipped orientation, as indicated by reference numeral 55. Similarly, FIG. 9 represents the formation of text objects 57, 59 in the form of the letter A in image-bearing portions 56, 60 with opposite orientations. FIG. 10 illustrates the formation of a graphic objects, in the form of simple stars 61, 63, with opposite orientations within image-bearing portions 36, 40 of tab 22. Finally, FIG. 11 illustrates the formation of similar graphic objects 65, 67 with opposite orientations within image-bearing portions 56, 60 of flag pair 48. In operation, a different set of objects can be specified for each tab 22 or flag pair 48 on a print sheet 34, 54. Indeed, in many cases, different objects will be formed within each flag 50, 52 in a given flag pair.

Figure 12:
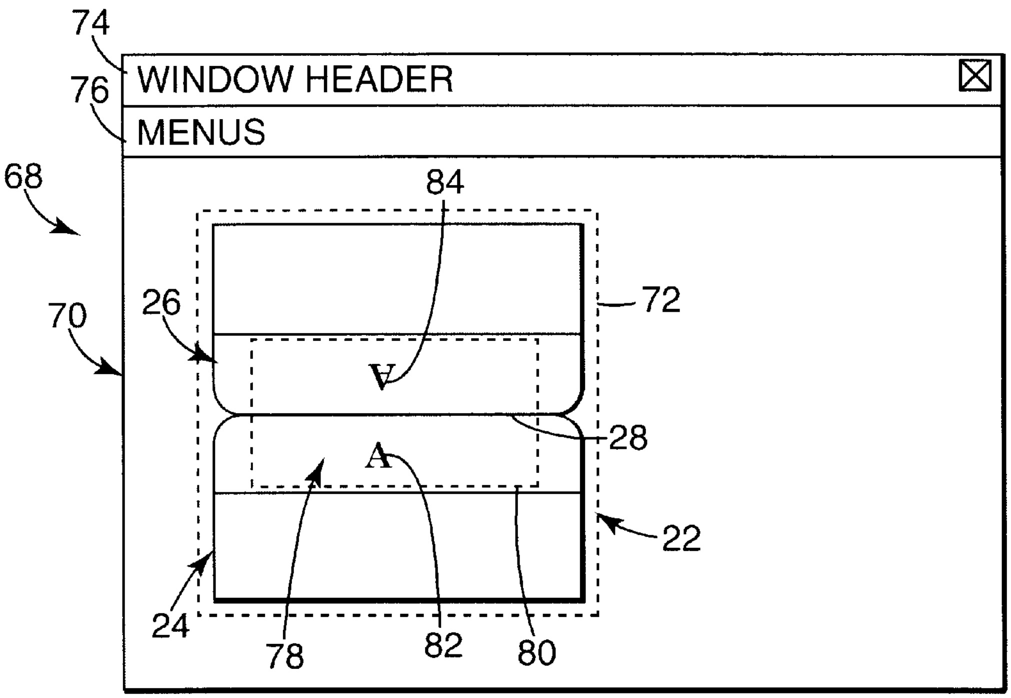
FIG. 12 is a diagram of a computer screen display generated for design of text and/or graphic imagery on flag or tab media.

FIG. 12 is a diagram of a computer viewing screen 68 presented for design of text and/or graphic imagery on flag or tab media, in accordance with an embodiment of the present invention. Screen 68, as illustrated in FIG. 12, can be produced by display device 18 under the control of processor 12. When a user starts the application program stored in memory 14, processor 12 drives display device 18 to present screen display 68. As shown in FIG. 12 screen display 68 may include a region in the form of a window 70. Window 70 includes a design area 72 containing a representation of an article such as a foldable tab or flag pair that is the subject of design. Design area 72 may be configured for resizing by the user, and resultant rescaling of the tab or flag pair represented in the design area. In the example of FIG. 12, the article in design area 72 is a foldable tab 22, as described with reference to FIGS. 2–5. In addition to design area 72, window 70 may include a window header 74 that provides information identifying the application program and/or a file associated with the article in design area 72 or a set of articles carried by a print sheet. Window 70 also may include a menu bar 76 with a variety of pull-down menus, tool buttons, and associated commands that can be selected to implement various design features described herein.

As shown in FIG. 12, the displayed representation of tab 22 includes a representation of first fold section 24 and second fold section 26, as well as fold line 28. Also, a user input area 78 is defined for entry of text and/or graphic objects by the end user. If desired, user input area 78 may be configured to extend over the entire surface of the tab 22 or flag pair 48. Also, the program can be arranged to allow a user to move and resize user input area 78 on a user preferred basis. A mechanism, such as a page turn arrow or scroll bar, could be incorporated whereby the user can move between different tabs 22 or flag pairs 48. As an alternative, an entire sheet of tabs 22 or flag pairs 48 could be displayed. In the example of FIG. 12, user input area 78 substantially coincides with image-bearing portions 36, 40 of the displayed representation of tab 22. The user specifies a graphic object for entry in area 78, for example, by pasting an object within the dotted lines 80. The user can carry out the paste function by positioning the cursor within area 78, for example, with a mouse or other pointing device, and selecting a paste function from menu bar 76. Alternatively, the application program code can be arranged to accept drag-and-drop operations whereby graphic objects are selected within a directory or folder and dragged into area 78.

As another alternative, an insert or import command can be selected from menu bar 76 to initiate a browse function. The user carries out the browse function to select a particular file representative of an object to be inserted into area 78. It is also conceivable that a file may contain multiple objects. The user also can enter a text object by activating a text object within area 78, and entering individual text characters in a sequential manner via a keyboard. The text object can be activated by selecting a text entry mode from menu bar 76 and placing the mouse cursor within area 78. Font, style, and size selection can be implemented via menu bar 76. The application program preferably is arranged such that, upon entry of an object, the user is able to move the object within area 78 by selecting it and dragging it with a mouse or other pointing device. Also, following design of a particular tab or flag, it may be desirable to include a feature whereby the content can be copied and pasted into additional tabs or flags. Similarly, a cut and paste or drag-and-drop feature can be incorporated whereby objects, either individually or in groups, can be moved between different tabs and flags.

In any of the above cases, processor 12 responds to user entry of the object by driving display device 18 to display the specified object with an ordinary orientation within image-bearing portion 36, and with a flipped orientation within image-bearing portion 40. Image-bearing portion 40 can be referred to as a "flip" zone, inasmuch as its content is effectively "flipped" relative to the content of image-bearing portion 36. In particular, to facilitate readability of the content of the "flip" zone by an end user when fold sections 24, 26 are folded inward, the content of image-bearing portion 36 is rotated. In this embodiment, the user selects a mode whereby an identical object is displayed within each of fold sections 24, 26, albeit with flipped orientations. This mode can be referred to as an auto-flip mode. If identical objects are desired, there is no need to separately specify objects for each of fold sections 24, 26. Rather, a single object can be specified and displayed in both sections 24, 26. Thus, if desired, the application program code can be arranged to, in effect, disable fold section 26 for purposes of object entry. In other words, the application program code can be configured in the auto-flip mode such that the user is only allowed to enter an object into the portion of area 78 corresponding to first fold section 24. The object entered by the user in first fold section 24 is automatically displayed, however, with a flipped orientation within second fold section 26.

As an alternative, the application program code can be arranged to permit entry of an object anywhere within area 78. Still, in this auto-flip mode, the identical object is displayed in both sections 24, 26 with different orientations. If the user enters the object within the portion of area 78 corresponding to second fold section 26 with a normal orientation, the object is nevertheless displayed within second fold section 26 with the flipped orientation. The flipped display can be accomplished by momentarily "flipping" the displayed object following entry by the end user. At the same time, the object is automatically displayed within first fold section 24 with a normal orientation. Thus, the user need only enter a single object in the auto-flip mode to achieve design of the article with identical objects in first and second fold sections 24, 26. In this manner, the application program code is arranged to automate the necessary flip function to reduce the complexity of the design task for the end user. The auto-flip mode eliminates the steps of manually entering identical objects in both sections 24, 26, identifying objects requiring flipping, and then entering a flip command relative to the objects. At the same time, however, this mode allows the user to select the particular characteristics of the object and position the object as desired within sections 24, 26.

In the example of FIG. 12, the object specified by the user is a text object in the form of the letter A. Processor 12 drives display device 18 to display the letter A in first fold section 24, as indicated by reference numeral 82. At the same time, in the auto-flip mode, processor 12 automatically displays the same letter A with a flipped orientation within second fold section 26, as indicated by reference numeral 84. Thus, the object is displayed automatically with a flipped orientation in the portion of tab 22 that requires inverted printing, i.e., the flip zone of second fold section 26. In this manner, the application program code introduces the necessary flipping function into the design workflow, without the need for manual intervention by the user. Once the design of tab 22 is complete, the user saves the design in a file. Prior to completion of the design, the user may elect to enter one or more additional objects, each of which are automatically displayed in both of sections 24, 26 with opposite orientations. For example, the user may desire to incorporate a number or letter in combination with a particular color band and/or a particular graphic object. Also, the user may design several tabs or flags arranged on a common print sheet. The tabs may be identical or carry different objects specified on an individual basis for each tab. At the time of the file save or at some later time, the user selects the file for printing. In response, processor 12 drives printer 20 to print a tab or tabs on print sheet 34 according to the contents of the file. Thus, printer 20 prints the object with a normal orientation within portion 36, and with a flipped orientation within portion 40. The user removes the printed tab 22 from print sheet 34 and manually folds the tab for use. In the folded position, the objects printed in both fold sections 24, 26, i.e., on both sides of tab 22, occupy a common orientation.

Figure 13:
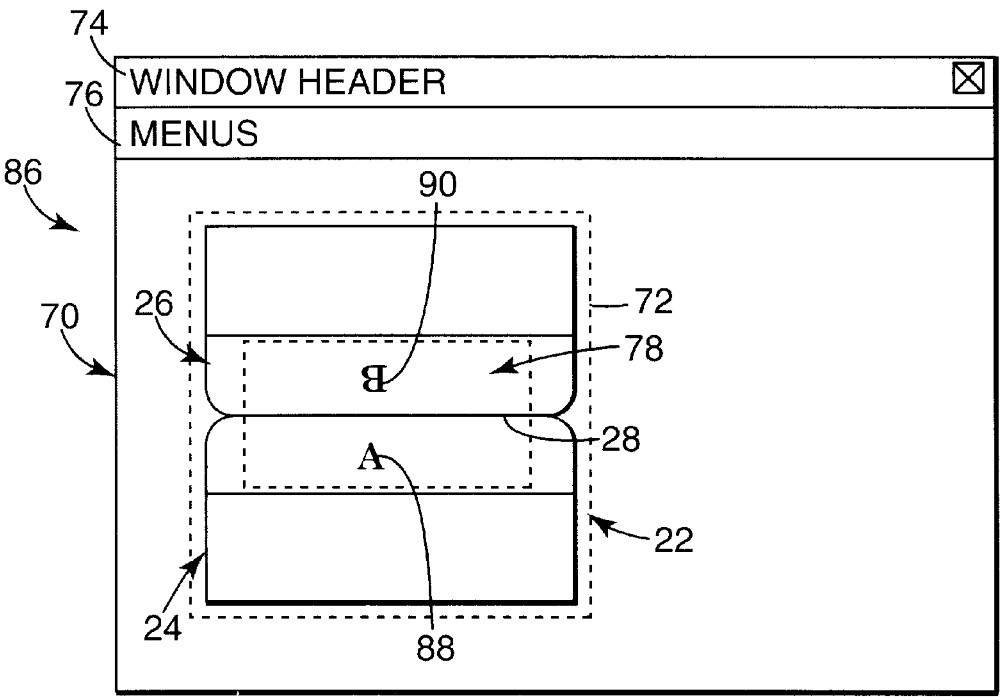
FIG. 13 is a diagram of a second screen display generated for design of text and/or graphic imagery on flag or tab media.

FIG. 13 is a diagram of a second computer viewing screen 86, illustrating an alternative mode of operation. Viewing screen 86 substantially corresponds to screen 68 of FIG. 12. In the example illustrated by FIG. 13, however, processor 12 does not automatically display an identical object in both fold sections 24, 26. Instead, the application program code is arranged to allow entry of different objects within fold sections 24, 26. In many cases, the user will desire that an identical object be printed on both sides of tab 22. For example, it may be desirable to present the same number or letter on both sides of an index tab. The user may desire, in other cases, that different objects be printed on opposites sides of tab 22. Whereas the user may desire that a particular letter or number be printed on one side, a different text object or a graphic object may be desired for the other side. As shown in FIG. 13, in this differential mode, the user can specify a text object such as the letter A, indicated by reference numeral 88, within first fold section 24. However, the user can specify a different text object such as letter B, indicated by reference numeral 90, within second fold section 26. As illustrated by FIG. 13, the different text objects 88, 90 entered in sections 24, 26 may have different fonts, styles, and point sizes. Moreover, the different objects may represent different object types. For example, the user may elect to enter a text object in section 24 and a graphic object in section 26. In either case, the object entered into the portion of area 78 corresponding to second section 26 is displayed with a flipped orientation. The object can be momentarily "flipped" following entry of the object into second section 26.

In the differential mode illustrated by FIG. 13, the user specifies the position at which the object is to be entered within area 78. Based on the specified position, processor 12 determines not only where to display the specified object, but also the orientation of the displayed object. If the user specifies that the object is to be placed within first fold section 24, for example, by positioning the cursor within the first fold section with a mouse, processor 12 drives display device 18 to display the object with a normal orientation. If the user specifies that the object is to be placed within second fold section 26, processor 12 drives display device 18 to display the object with a flipped orientation. The object can be initially displayed with a normal orientation, and then rotated to the "flipped" orientation. Thus, the object is displayed with a normal orientation within first fold section 24 in the event the specified position of the object is within the first fold section. Alternatively, the object is displayed with a flipped orientation within second fold section 26 in the event the specified position of the object is within the second fold section. In this manner, the workflow of the design process again benefits from automation of the flip function. At the same time, however, the user is able to freely specify different text and/or graphic objects to be placed within fold sections 24, 26.

Figure 14:
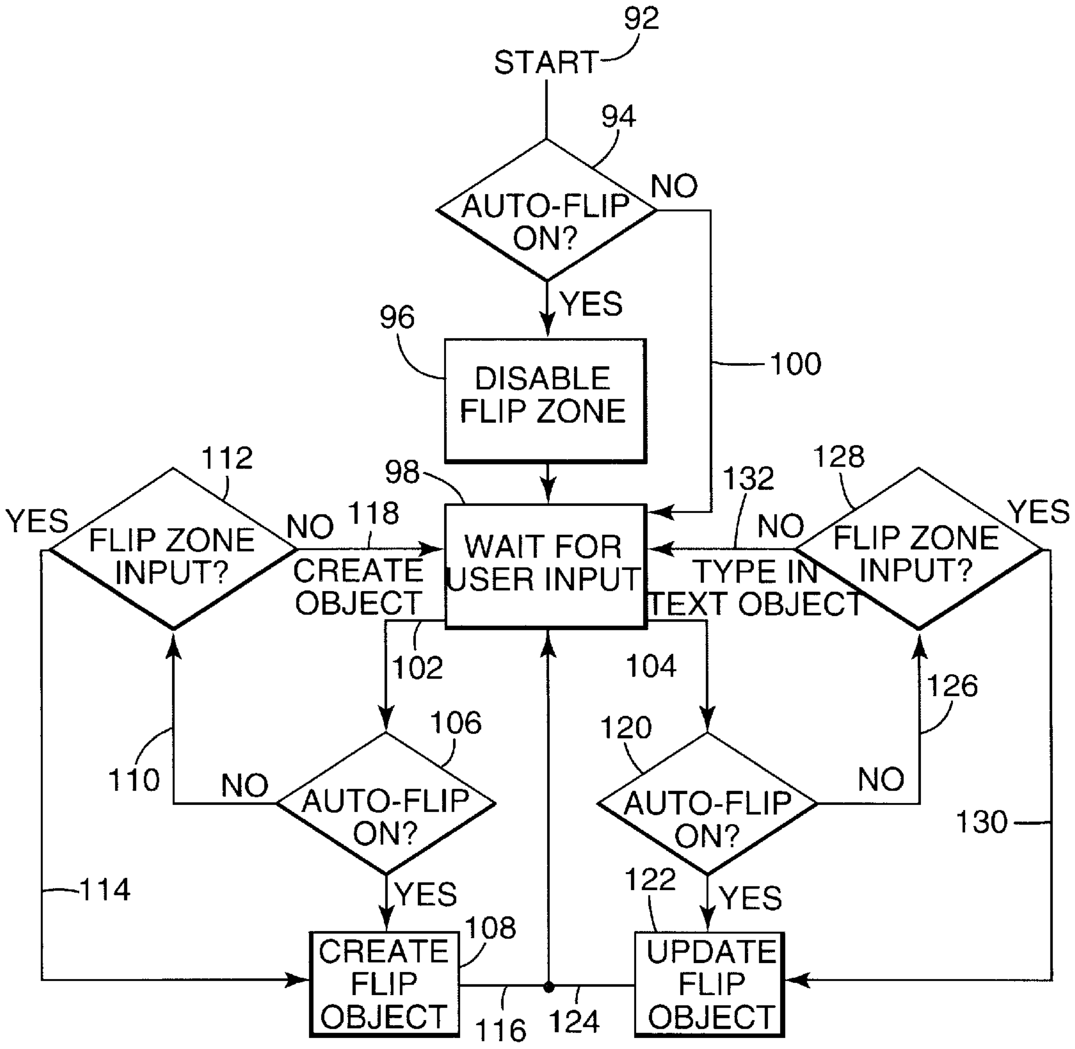
FIG. 14 is a flow diagram illustrating a method for design of text and/or graphic imagery on flag or tab media.

FIG. 14 is a flow diagram illustrating a method for design of text and/or graphic imagery on flag or tab media. The flow diagram illustrates the availability of both auto-flip and differential modes of operation, as described with reference to screens 68, 86 of FIGS. 11 and 12, respectively. When the user starts the application program, as indicated by reference numeral 92, the program code is loaded into random access memory (RAM) associated with processor 12 for execution. Processor 12 first drives display device 18 to produce a viewing screen, as illustrated in FIGS. 12 and 13. The screen presents a foldable tab or a pair of flags depending on the design task chosen by the user. Processor 12 then allows the user to select either the auto-flip or differential mode for design of the displayed article. In particular, as indicated by block 94, processor 12 queries whether the auto-flip mode has been selected.

If so, processor 12 proceeds to disable the flip zone, as indicated by block 96. In other words, processor 12 prevents the user from entering an object into the inverted portion of the article. Processor 12 proceeds to wait for user input, as indicated by block 98, but only accepts input that resides within the non-inverted portion of the article. In the case of a tab 22, the inverted portion, or flip zone, is the portion of user input area 78 corresponding to second fold section 26. In the case of flag pair 48, the inverted portion would be second flag 52 and, in particular, image-bearing portion 60 to the extent that it coincides with the user input area 78 of viewing screen 68.

In the auto-flip mode, the user is only permitted to enter an object into the normally oriented portion of the article. In the case of tab 22, for example, the user is permitted to enter a text object into the portion of area 78 corresponding to first fold section 24. For a flag pair 48, the user is permitted to enter a text object into the portion of area 78 corresponding to first flag 50. Processor 12 displays the object, however, in both portions of the article. In this manner, the user is able to enter identical objects on both sides of tab 22 or on both flags 50, 52 by entering a single object. The flipping process for display of the object within the flip zone is automated.

If the auto-flip mode is not selected, processor 12 proceeds directly to wait for user input, as indicated by line 100, without disabling the flip zone. Instead, processor 12 accepts objects entered by the user without regard to the position of the object within user input area 78. Also, processor 12 accepts different objects for different portions of the article. Thus, processor 12 operates in the differential mode described with reference to FIG. 13. Based on the position of the entered object, however, processor 12 determines whether to flip the object.

As user input is received in the form of text and/or graphic object data, as indicated by block 98, processor 12 determines whether the user is creating a new text or graphic object, as indicated by line 102, or adding additional characters to an active text object, as indicated by line 104. If the user is specifying a new text or graphic object, processor 12 again queries whether the auto-flip mode is selected, as indicated by block 106. If the auto-flip mode is selected, processor 12 creates an object representative of the object in a flipped orientation, as indicated by block 108. Processor 12 creates the flipped object based on a bit map representation of the object. If the object is represented in a different format, conversion to the bit map format may be necessary.

Processor 12 manipulates the bit map on a point-by-point basis by assigning a new address to each point. The new addresses correspond to points within the flip zone that provide a representation of the object with a flipped orientation. Processor 12 can be configured to compute the new addresses using a geometric rotation operation, for example, with matrices. The rotation operation can be performed relative to a center point of the article such that the object is displayed with both orientations at substantially equal distance from the center point. With tab 22, for example, the rotation can be performed relative to a point on center line 28. Once an address is computed for each point in the bitmap, processor 12 drives display device 18 to display the object in the flip zone with the flipped orientation.

If the auto-flip mode is not selected, as indicated by line 110, the differential mode is activated. Thus, the differential mode can be considered the default mode in this embodiment, although the opposite arrangement could be selected. In the differential mode, processor 12 accepts objects entered by the user within both the inverted and non-inverted portions of the article. However, processor 12 must determine whether a particular object is entered within the flip zone, as indicated by block 112. Processor 12 determines the relative position of the object by reference to the coordinates of the object within the display or, at a higher level, the setting of a position flag indicative of the coordinates. If the user attempts to enter an object between the inverted and non-inverted portions of the article, processor 12 may be configured to assign the object to one of the portions based on the relative coordinates. To avoid toggling, processor 12 may incorporate a hysteresis effect into the coordinate evaluation.

In any event, if processor 12 determines that the object lies within the inverted portion, or flip zone, a flip object is created, as indicated by line 114 and block 108. Following creation of the flip object, processor 12 returns to wait for user input, as indicated by line 116 and block 98. Thus, any object that is entered into the flip zone is automatically "flipped" by processor 12 and displayed with the resulting orientation. If the user enters the object into the non-inverted portion, however, processor 12 maintains the object in its non-inverted orientation and returns to wait for user input, as indicated by line 118 and block 98.

If the input received from the user constitutes the entry of additional characters to an active text object, processor 12 again determines whether the auto-flip mode is selected, as indicated by block 120. If so, processor 12 automatically updates a pending flipped object that corresponds to the active text object, as indicated by block 122. Processor 12 then returns to wait for additional user input, as indicated by line 124. If the auto-flip mode is not selected, processor 12 queries whether the object constitutes flip zone input, as indicated by line 126 and block 128. In this case, processor 12 does not necessarily determine whether each additional character is entered in the flip zone. Indeed, all characters entered for an active text object will reside in the same area as that text object. Thus, processor 12 may simply refer to a flag that has been set for the text object. If the text object resides in the flip zone, processor 12 proceeds to update a corresponding flipped object with the additional character, as indicated by line 130 and block 122. Following the update, processor 12 proceeds to wait for user input, as indicated by line 124. If the text object resides in the non-inverted portion of the article, processor 12 simply proceeds to wait for user input, as indicated by line 132 and block 98. In this case, the object is displayed in a non-flipped orientation.

Although not illustrated in FIG. 14, the user input could further include changes to either an existing text or graphic object, such as changes in object position, e.g., by dragging the object, changes in font or style, or changes in size. In this case, an applicable flip object could be updated with such changes. Also, if the position of the object changes, processor 12 could reevaluate whether the object continues to reside in the flip zone, if the differential mode is selected. If not, processor 12 can be configured to modify the orientation of the object as appropriate, depending on its position relative to the flip zone. For example, if the object is positioned in the non-inverted region, it can be displayed with a non-flipped, i.e., "normal," orientation.

Figure 15:
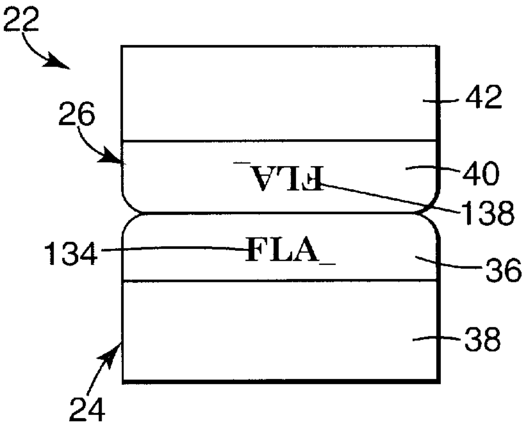
FIG. 15 is a diagram illustrating real-time design of text imagery on a tab as shown in FIG. 2.
Figure 16:
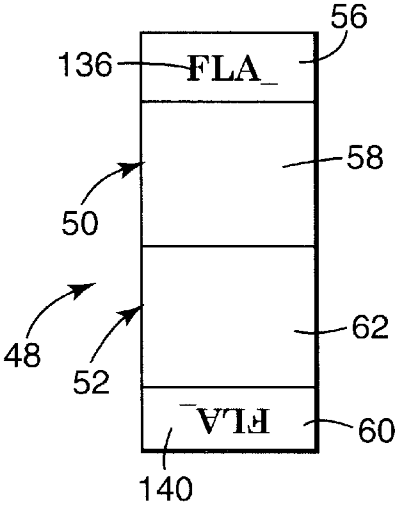
FIG. 16 is a diagram illustrating real-time design of text imagery on a flag pair as shown in FIG. 5.

FIGS. 15–19 are diagrams illustrating a variety of additional features that can be implemented by appropriate configuration of the application program executed by processor 12. FIGS. 15 and 16, for example, illustrate a mode whereby individual text characters that are entered by the user and added to an active text object are used to immediately update a pending flipped object with an apparent real-time response. The individual characters are entered into the active text object in the non-flipped orientation. At the same time, the updated flipped object is displayed in the flipped orientation and refreshed for every new character entered by the user. In this manner, the individual characters are displayed in the flipped orientation substantially simultaneously with entry of the characters into the active text object. This process gives the effect of real-time display of the flipped object. With reference to FIGS. 15 and 16, if a user is in the process of entering the word "FLAG" into an active text object in first fold section 24 or first flag 50, as indicated by reference numerals 134, 136, each character is displayed substantially simultaneously in second fold section 26 and second flag 52, as indicated by reference numerals 138, 140.

Figure 17:
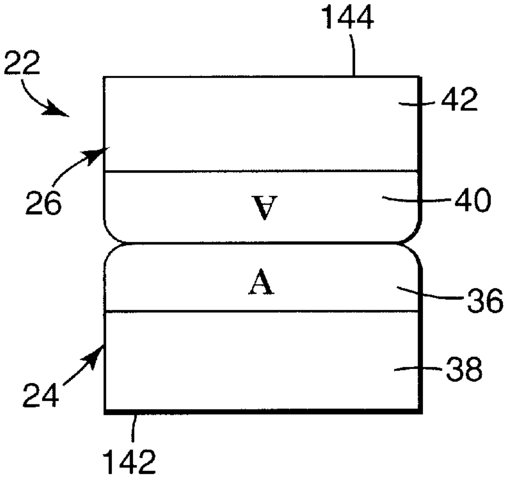
FIG. 17 is a diagram illustrating design of text imagery and color borders on a tab as shown in FIG. 2.
Figure 18:
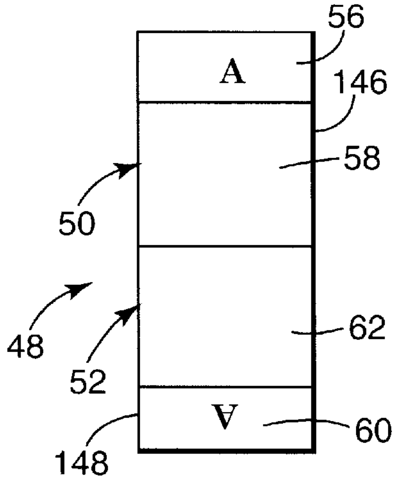
FIG. 18 is a diagram illustrating design of text imagery and color borders on a flag pair as shown in FIG. 5.

FIGS. 17 and 18 illustrate a mode whereby color borders can be added to the respective tab 22 or flag pair 48. In FIG. 17, for example, color borders 142, 144 are formed about the periphery of first fold section 24 and second fold section 26, respectively. In FIG. 18, color borders 146, 158 are formed about first flag 50 and second flag 52, respectively. Color borders 142, 144, 146, 148, or other colored structures can be formed within tab 22 or flags 50, 52 to further distinguish individual tabs and flags from one another, thereby aiding in indexing and marking functions. Thus, the user can select differently colored borders for different tabs or flags. In particular, the user can specify different colors for different tabs or flags on a single print sheet. This color border mode can be implemented, for example, by the incorporation of a border command in the menu bar. Alternatively, differently colored borders may form part of a set of graphic objects available to the user in a drag-and-drop or browse mode. The colors can be selected by reference to a color palette, consistent with many conventional graphic design applications. In one embodiment, a predetermined set of color borders can be provided as a default for a set of tabs or flags arranged on a print sheet. The user can select the default border set and then proceed with creation of text and/or graphic objects for incorporation in each individual tab or flag.

Figure 19:
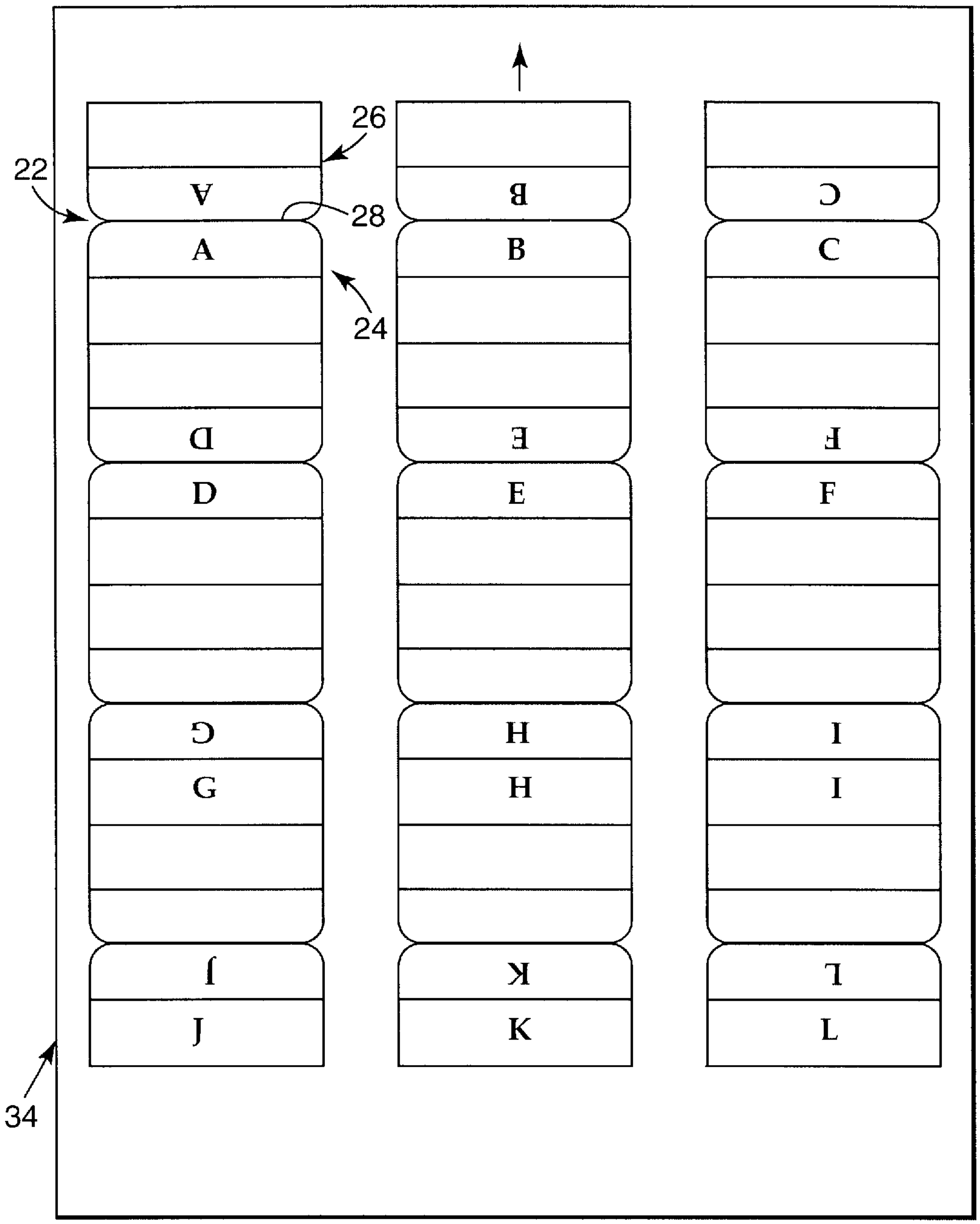
FIG. 19 is a diagram illustrating a merge print using a tab print sheet as shown in FIG. 3.

FIG. 19 illustrates the printing of an entire print sheet 24 carrying several tabs 22. As shown in FIG. 19, tabs 22 include text objects defined according to a selected sequence. In particular, each tab 22 carries a different letter, A–L, in both the non-flipped orientation in first fold section 24 and the flipped orientation in fold section 26. Sequential letters, numbers, or other text characters can be selected by the end user as a default index set. The characters in the default index set are then applied automatically to tabs 22 within print sheet 34 with the necessary orientations. The default index set could form one of several templates or macros incorporated in the design application program. In addition to the default index set, the application program could be further arranged to enable the user to enter additional objects. For example, the user could elect to enter certain graphic objects along with the text objects defined by the default index set. Also, the user may desire to incorporate additional text objects. Thus, the default index set may serve as component of the object set formed on tabs 22. Although tabs 22 are illustrated in FIG. 19, the default index set is readily applicable to a print sheet 54 carrying flags 50, 52, as shown in FIG. 6.

As a further feature, the design application program could be arranged to provide a merge data feature whereby objects defined by an end user are printed onto multiple tabs or flags carried on multiple sheets of media. For example, if a user wants to print N objects indicative of a sequence N on differently colored media, and m different colors are available for the media, where m is less than N, the (m+1)th object must be printed by reusing one of the colors. If media sharing common colors are carried on print sheets and the objects are printed sequentially, it may be necessary to refeed one of the sheets to reuse colors for those objects from m+1 to N. To avoid the need to refeed sheets, however, the print order of the objects can be altered in accordance with an embodiment of the present invention. For example, the first and (m+1)th objects can be printed sequentially on a common sheet before the second object and (m+2)th objects are printed on the second sheet. As an example, the user may obtain a kit with five different sheets of tabs or flags, each sheet carrying tabs or flags having a different color band or border. Thus, in this example, the kit would provide five different colors for tab or flag printing. The user may desire ten flags or tabs differing in color for attachment to a fifth cut hanging file folder set, i.e., a set of folders sized to receive flags or tabs at one of five positions staggered across the top of the folder.

Figure 20:
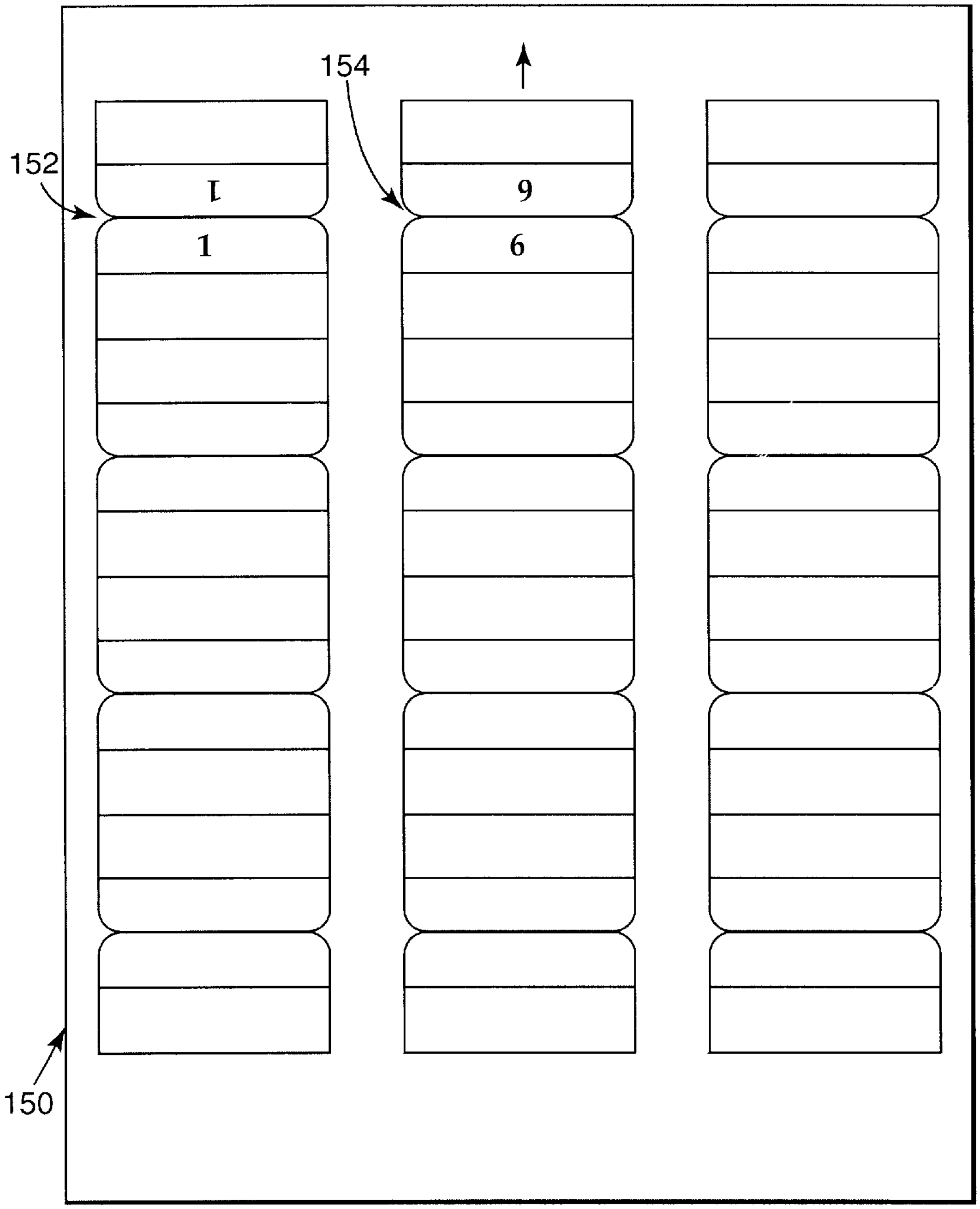
FIG. 20 is a diagram illustrating a merge print using a tab print sheet in which print order is varied relative to the logical order of a desired sequence.

With a merge data feature, the user could elect to print all ten tabs or flags among the five differently colored tab or flag sheets without the need to refeed the sheets. In particular, the application program could be arranged such that the print order differs from the logical order of the ten tabs or flags. For example, tabs or flags A and F (or 1 and 6 in the case of numeric objects) could be printed on a first sheet, e.g., red, tabs or flags B and G (or 2 and 7 in the case of numeric objects) could be printed on a second sheet, e.g., blue, tabs or flags C and H (or 3 and 8 in the case of numeric objects) could be printed on a third sheet, e.g., green, tabs or flags D and I (or 4 and 9 in the case of numeric objects) could be printed on a fourth sheet, e.g., yellow, and tabs or flags E and J (or 5 and 10 in the case of numeric objects) could be printed on a fifth sheet, e.g., purple. In this manner, the user prints a subset of the tabs or flags provided on the print sheet, and assigns one of the five colors to each of the ten tabs or flags without the need to refeed the sheets. As an illustration, the sixth tab or flag in the logical order of the ten-tab or flag sequence is not the sixth tab or flag to be printed. Rather, it is printed on the first sheet along with the first tab or flag, in recognition that the sixth tab or flag will be the first one to reuse the red color. FIG. 20 provides an illustration of a single sheet 150 carrying tabs 152, 154 bearing the first and sixth numeric objects of a ten-object sequence, given a selection of five different colors.

As an alternative to the use of differently colored sheets, the user could specify particular color borders for tabs formed on a single print sheet, and then print the entire sheet or a subset of tabs with the specified color borders rather than rely of pre-printed colors.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for producing a printed article having first and second portions, the method comprising:

displaying a representation of the article on a display device;

receiving user input specifying an object to be formed within the article;

automatically displaying the object with a first orientation within the first portion of the displayed article; and automatically displaying the object with a second orientation within the second portion of the displayed article, wherein the second orientation is different from the first orientation.

2. The method of claim 1, wherein the second orientation is rotated relative to the first orientation.

3. The method of claim 1, wherein the second orientation is rotated approximately 180 degrees relative to the first orientation.

4. The method of claim 1, wherein the article includes a foldable tab, the first portion is a first fold section of the tab, and the second portion is a second fold section of the tab.

5. The method of claim 1, wherein the article includes a pair of first and second flags, the first portion is the first flag, and the second portion is the second flag, the second flag being arranged with an inverted orientation relative to the first flag.

6. The method of claim 1, wherein the object includes at least one of a text object and a graphic object.

7. The method of claim 1, further comprising automatically displaying the object with the second orientation within the second portion of the displayed article in response to the user input.

8. The method of claim 1, wherein the object includes a text object, and the user input includes one or more individual text symbols entered sequentially by a user, the method further comprising:

automatically displaying the individual text symbols with the first orientation within the first portion of the displayed article as the individual text symbols are entered by the user; and automatically displaying the individual text symbols with the second orientation within the second portion of the displayed article as the individual text symbols are entered by the user, wherein the second orientation is rotated approximately 180 degrees relative to the first orientation.

9. The method of claim 1, further comprising driving a printing device to form a printed article that substantially corresponds to the displayed article.

10. The method of claim 1, further comprising forming a plurality of different displayed articles, and driving a printing device to form a plurality of different printed articles, each of the different printed articles substantially corresponding to one of the different displayed articles.

11. The method of claim 1, further comprising driving a printing device to form a printed article that substantially corresponds to the displayed article, wherein the printed article includes a foldable tab having a first printed fold section that substantially corresponds to the first portion of the displayed article and a second printed fold section that substantially corresponds to the second portion of the displayed article, the tab further including an adhesive material on a side opposite the first and second printed fold sections, whereby the printed tab is foldable for adhesive attachment to opposite sides of a sheet-like element such that each of the first and second fold sections is visible from a different side of the sheet-like element.

12. The method of claim 1, further comprising driving a printing device to form a printed article that substantially corresponds to the displayed article, wherein the printed article includes a first printed flag that substantially corresponds to the first portion of the displayed article and a second printed flag that substantially corresponds to the second portion of the displayed article, the second printed flag being arranged with an inverse orientation relative to the first printed flag, and each of the first and second flags including an adhesive material, whereby the printed flags are configured for adhesive attachment to a sheet-like element.

13. A method for producing a printed article having first and second portions, the method comprising:

displaying a representation of the article on a display device;

receiving user input specifying an object to be formed within the article and a position of the object;

automatically displaying the object with a first orientation within the first portion of the displayed article in the event the position of the object is within the first portion of the displayed article; and automatically displaying the object with a second orientation within the second portion of the displayed article in the event the position of the object is within the second portion of the displayed article, wherein the second orientation is different from the first orientation.

14. The method of claim 13, wherein the second orientation is rotated relative to the first orientation.

15. The method of claim 13, wherein the second orientation is rotated approximately 180 degrees relative to the first orientation.

16. The method of claim 13, wherein the article includes a foldable tab, the first portion is a first fold section of the tab, and the second portion is a second fold section of the tab.

17. The method of claim 13, wherein the article includes a pair of first and second flags, the first portion is the first flag, and the second portion is the second flag, the second flag being arranged with an inverted orientation relative to the first flag.

18. The method of claim 13, wherein the object includes at least one of a text object and a graphic object.

19. The method of claim 13, wherein the object includes a text object, and the user input includes one or more individual text symbols entered sequentially by a user, the method further comprising:

automatically displaying the individual text symbols within the first portion of the displayed article as the individual text symbols are entered by the user in the event the position of the position of the object is within the first portion of the displayed article; and automatically displaying the individual text symbols with the second orientation within the second portion of the displayed article as the individual text symbols are entered by the user in the event the position of the object is within the second portion of the displayed article.

20. The method of claim 13, further comprising driving a printing device to form a printed article that substantially corresponds to the displayed article.

21. The method of claim 13, further comprising forming a plurality of different displayed articles, and driving a printing device to form a plurality of different printed articles, each of the different printed articles substantially corresponding to one of the different displayed articles.

22. The method of claim 13, further comprising driving a printing device to form a printed article that substantially corresponds to the displayed article, wherein the printed article is a foldable tab having a first printed fold section that substantially corresponds to the first portion of the displayed article and a second printed fold section that substantially corresponds to the second portion of the displayed article, the printed tab further including an adhesive material on a side opposite the first and second printed fold sections, whereby the printed tab is foldable for adhesive attachment to opposite sides of a sheet-like member such that each of the first and second fold sections is visible from a different side of the sheet-like member.

23. The method of claim 13, further comprising driving a printing device to form a printed article that substantially corresponds to the displayed article, wherein the printed article includes a first printed flag that substantially corresponds to the first portion of the displayed article and a second printed flag that substantially corresponds to the second portion of the displayed article, the second printed flag being arranged with an inverse orientation relative to the first printed flag, and each of the first and second flags including an adhesive material, whereby the printed flags are configured for adhesive attachment to a sheet-like element.

24. A computer readable medium encoded with a computer program, the program being arranged such that, when the program is executed:

a representation of an article having first and second portions is displayed on a display device;

user input is received specifying an object to be formed within the article;

the object is automatically displayed with a first orientation within the first portion of the displayed article; and the object is automatically displayed with a second orientation within the second portion of the displayed article, wherein the second orientation is different from the first orientation.

25. The computer readable medium of claim 24, wherein the second orientation is rotated relative to the first orientation.

26. The computer readable medium of claim 24, wherein the second orientation is rotated approximately 180 degrees relative to the first orientation.

27. The computer readable medium of claim 24, wherein the article includes a foldable tab, the first portion is a first fold section of the tab, and the second portion is a second fold section of the tab.

28. The computer readable medium of claim 24, wherein the article includes a pair of first and second flags, the first portion is the first flag, and the second portion is the second flag, the second flag being arranged with an inverted orientation relative to the first flag.

29. The computer readable medium of claim 24, wherein the object includes at least one of a text object and a graphic object.

30. The computer readable medium of claim 24, wherein the computer program is further arranged such that, when the program is executed, the object is automatically displayed with the second orientation within the second portion of the displayed article in response to the user input.

31. The computer readable medium of claim 24, wherein the object includes a text object, and the user input includes one or more individual text symbols entered sequentially by a user, the computer readable medium being further arranged such that, when the program is executed:

the individual text symbols are automatically displayed within the first portion of the displayed article as the individual text symbols are entered by the user; and the individual text symbols are automatically displayed in the second orientation within the second portion of the displayed article as the individual text symbols are entered by the user.

32. The computer readable medium of claim 24, the computer readable medium being further arranged such that, when the program is executed, a printing device is driven to form a printed article that substantially corresponds to the displayed article.

33. The computer readable medium of claim 24, the computer readable medium being further arranged such that, when the program is executed, a printing device is driven to form a plurality of different printed articles, each of the different printed articles substantially corresponding to one of the different displayed articles.

34. The computer readable medium of claim 24, the computer readable medium being further arranged such that, when the program is executed, a printing device is driven to form a printed article that substantially corresponds to the displayed article, wherein the printed article includes a foldable tab having a first printed fold section that substantially corresponds to the first portion of the displayed article and a second printed fold section that substantially corresponds to the second portion of the displayed article, the tab further including an adhesive material on a side opposite the first and second printed fold sections, whereby the printed tab is foldable for adhesive attachment to opposite sides of a sheet-like element such that each of the first and second fold sections is visible from a different side of the sheet-like element.

35. The computer readable medium of claim 24, the computer readable medium being further arranged such that, when the program is executed, a printing device is driven to form a printed article that substantially corresponds to the displayed article, wherein the printed article includes a first printed flag that substantially corresponds to the first portion of the displayed article and a second printed flag that substantially corresponds to the second portion of the displayed article, the second printed flag being arranged with an inverse orientation relative to the first printed flag, and each of the first and second flags including an adhesive material, whereby the printed flags are configured for adhesive attachment to a sheet-like element.

36. A computer readable medium encoded with a computer program, the program being arranged such that, when the program is executed:

a representation of the article is displayed on a display device;

user input is received specifying an object to be formed within the article and a position of the object;

the object is automatically displayed with a first orientation within the first portion of the displayed article in the event the position of the object is within the first portion of the displayed article; and the object is automatically displayed with a second orientation within the second portion of the displayed article in the event the position of the object is within the second portion of the displayed article, wherein the second orientation is different from the first orientation.

37. The computer readable medium of claim 36, wherein the second orientation is rotated relative to the first orientation.

38. The computer readable medium of claim 36, wherein the second orientation is rotated approximately 180 degrees relative to the first orientation.

39. The computer readable medium of claim 36, wherein the article includes a foldable tab, the first portion is a first fold section of the tab, and the second portion is a second fold section of the tab.

40. The computer readable medium of claim 36, wherein the article includes a pair of first and second flags, the first portion is the first flag, and the second portion is the second flag, the second flag being arranged with an inverted orientation relative to the first flag.

41. The computer readable medium of claim 36, wherein the object includes at least one of a text object and a graphic object.

42. The computer readable medium of claim 36, wherein the computer program is further arranged such that, when the program is executed, the object is automatically displayed with the second orientation within the second portion of the displayed article in response to the user input.

43. The computer readable medium of claim 36, wherein the object includes a text object, and the user input includes one or more individual text symbols entered sequentially by a user, the computer readable medium being further arranged such that, when the program is executed:

the individual text symbols are automatically displayed within the first portion of the displayed article as the individual text symbols are entered by the user; and the individual text symbols are automatically displayed in the second orientation within the second portion of the displayed article as the individual text symbols are entered by the user.

44. The computer readable medium of claim 36, the computer readable medium being further arranged such that, when the program is executed, a printing device is driven to form a printed article that substantially corresponds to the displayed article.

45. The computer readable medium of claim 36, the computer readable medium being further arranged such that, when the program is executed, a printing device is driven to form a plurality of different printed articles, each of the different printed articles substantially corresponding to one of the different displayed articles.

46. The computer readable medium of claim 36, the computer readable medium being further arranged such that, when the program is executed, a printing device is driven to form a printed article that substantially corresponds to the displayed article, wherein the printed article includes a foldable tab having a first printed fold section that substantially corresponds to the first portion of the displayed article and a second printed fold section that substantially corresponds to the second portion of the displayed article, the tab further including an adhesive material on a side opposite the first and second printed fold sections, whereby the printed tab is foldable for adhesive attachment to opposite sides of a sheet-like element such that each of the first and second fold sections is visible from a different side of the sheet-like element.

47. The computer readable medium of claim 36, the computer readable medium being further arranged such that, when the program is executed, a printing device is driven to form a printed article that substantially corresponds to the displayed article, wherein the printed article includes a first printed flag that substantially corresponds to the first portion of the displayed article and a second printed flag that substantially corresponds to the second portion of the displayed article, the second printed flag being arranged with an inverse orientation relative to the first printed flag, and each of the first and second flags including an adhesive material, whereby the printed flags are configured for adhesive attachment to a sheet-like element.

48. A method for producing a foldable tab having first and second fold sections and an adhesive material, whereby the tab is foldable for adhesive attachment to opposite sides of a sheet-like member such that each of the first and second fold sections is visible from a different side of the sheet-like member, the method comprising:

displaying a representation of the tab on a display device;

receiving user input specifying an object to be formed within the tab;

automatically displaying the object within the first fold section of the displayed tab;

automatically displaying the object with a rotated orientation within the second section of the displayed tab; and driving a printing device to form a printed tab that substantially conforms to the displayed tab.

49. A method for producing a pair of first and second flags, the second flag being arranged with an inverse orientation relative to the first flag, and each of the first and second flags including an adhesive material, whereby the flags are configured for adhesive attachment to a sheet-like element, the method comprising:

displaying a representation of the first and second flags on a display device;

receiving user input specifying an object to be formed within the first and second flags;

automatically displaying the object within the first flag;

automatically displaying the object with a rotated orientation within the second flag; and driving a printing device to form a first printed flag that substantially conforms to the first displayed flag, and a second printed flag that substantially conforms to the second displayed flag.

50. A method for producing a foldable tab having first and second fold sections and an adhesive material, whereby the tab is foldable for adhesive attachment to opposite sides of a sheet-like member such that each of the first and second fold sections is visible from a different side of the sheet-like member, the method comprising:

displaying a representation of the tab on a display device;

receiving user input specifying an object to be formed within the tab and a position of the object;

automatically displaying the object within the first section of the displayed tab in the event the position of the object is within the first section of the displayed tab;

automatically displaying the object with a rotated orientation within the second section of the displayed tab in the event the position of the object is within the second section of the displayed tab; and driving a printing device to form a printed tab that substantially conforms to the displayed tab.

51. A method for producing a pair of first and second flags, the second flag being arranged with an inverse orientation relative to the first flag, and each of the first and second flags including an adhesive material, whereby the flags are configured for adhesive attachment to a sheet-like element, the method comprising:

displaying a representation of the first and second flags on a display device;

receiving user input specifying an object to be formed within the first and second flags and a position of the object;

automatically displaying the object within the first flag in the event the position of the object is within the first flag;

automatically displaying the object with a rotated orientation within the second flag in the event the position of the object is within the second flag; and driving a printing device to form a first printed flag that substantially conforms to the first displayed flag and a second printed flag that substantially conforms to the second displayed flag.

52. A method for printing N objects indicative of a sequence 1–N on differently colored media having m different colors and carried on print sheets, wherein m is less than N, and each of the color media sharing a common one of the colors is carried on a common one of the print sheets, the method comprising:

printing a first one of the objects on one of the media on a first one of the print sheets corresponding to a first one of the colors;

printing a second one of the objects on one of the media on a second one of the print sheets corresponding to a second one of the colors; and printing an (m+1)th one of the objects on one of the media on the first one of the print sheets, wherein both the first and (m+1)th objects are printed prior to printing the second object.

* * * * *